Jan. 19, 1926. 1,570,258
D. S. KENNEDY
TYPOGRAPHICAL COMPOSING AND DISTRIBUTING MACHINE
Filed June 20, 1924   7 Sheets-Sheet 1

INVENTOR
David S. Kennedy
BY
Rogers, Kennedy Campbell
ATTORNEYS

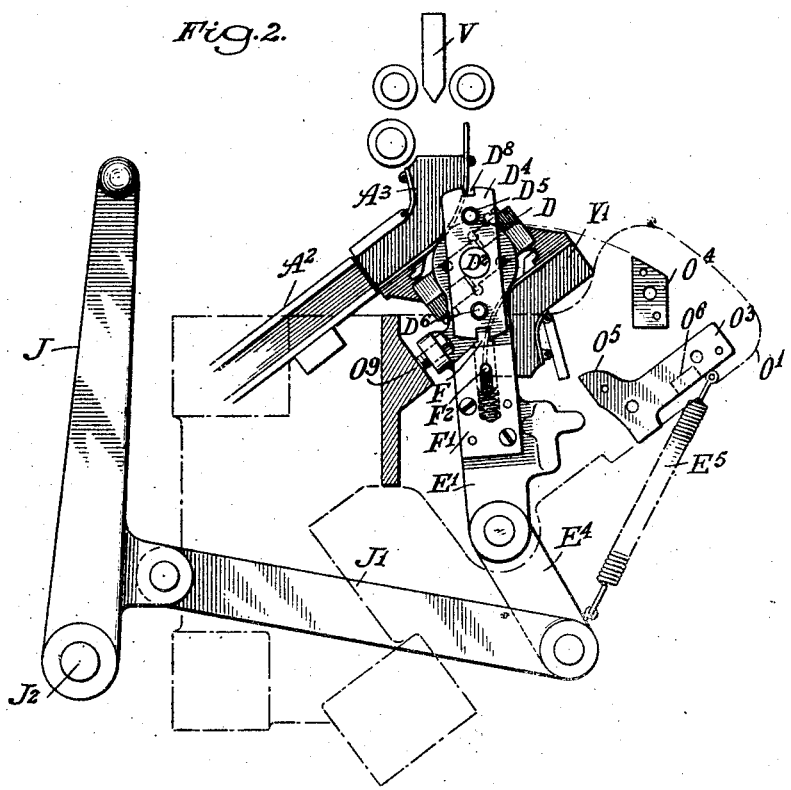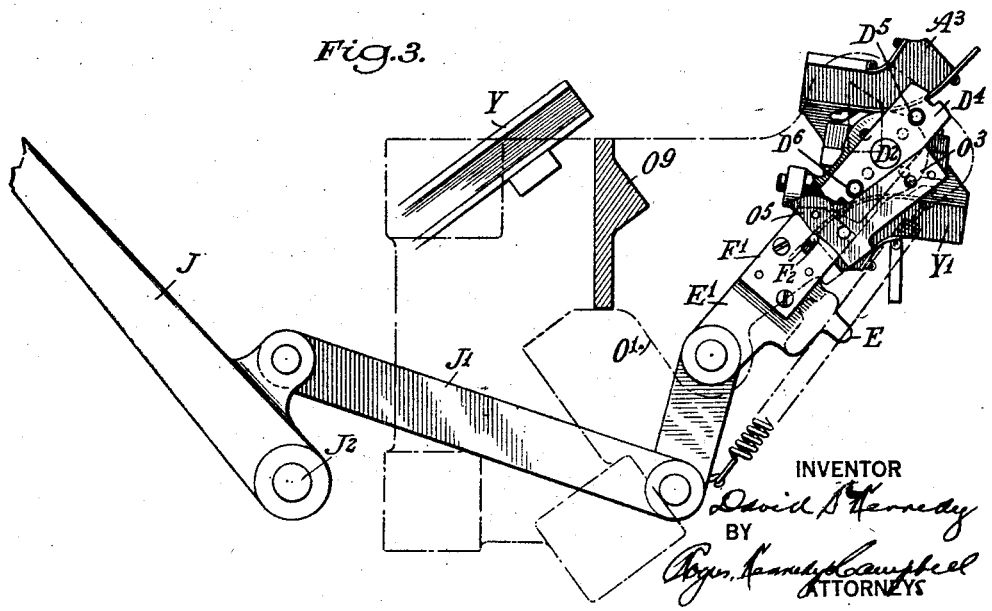

Jan. 19, 1926. 1,570,258
D. S. KENNEDY
TYPOGRAPHICAL COMPOSING AND DISTRIBUTING MACHINE
Filed June 20, 1924 7 Sheets-Sheet 3
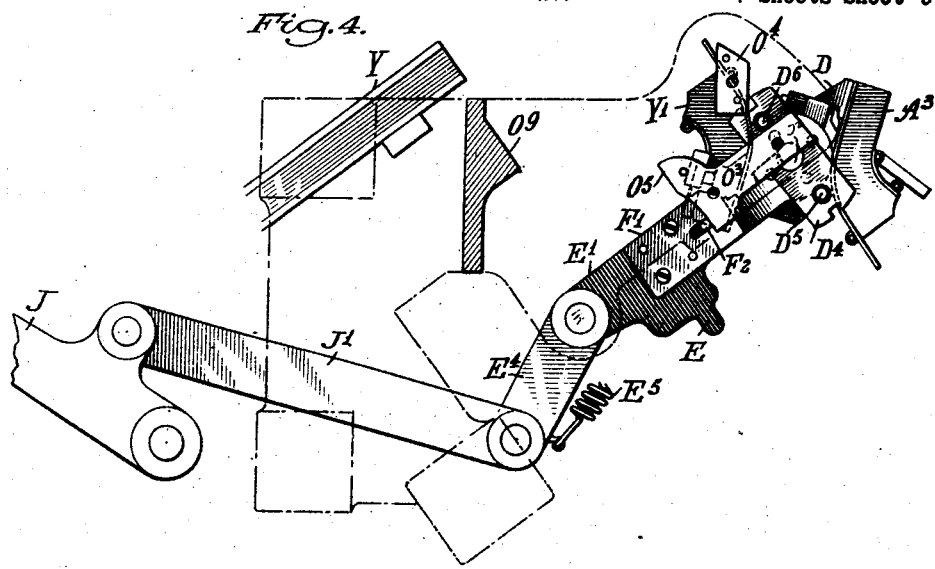
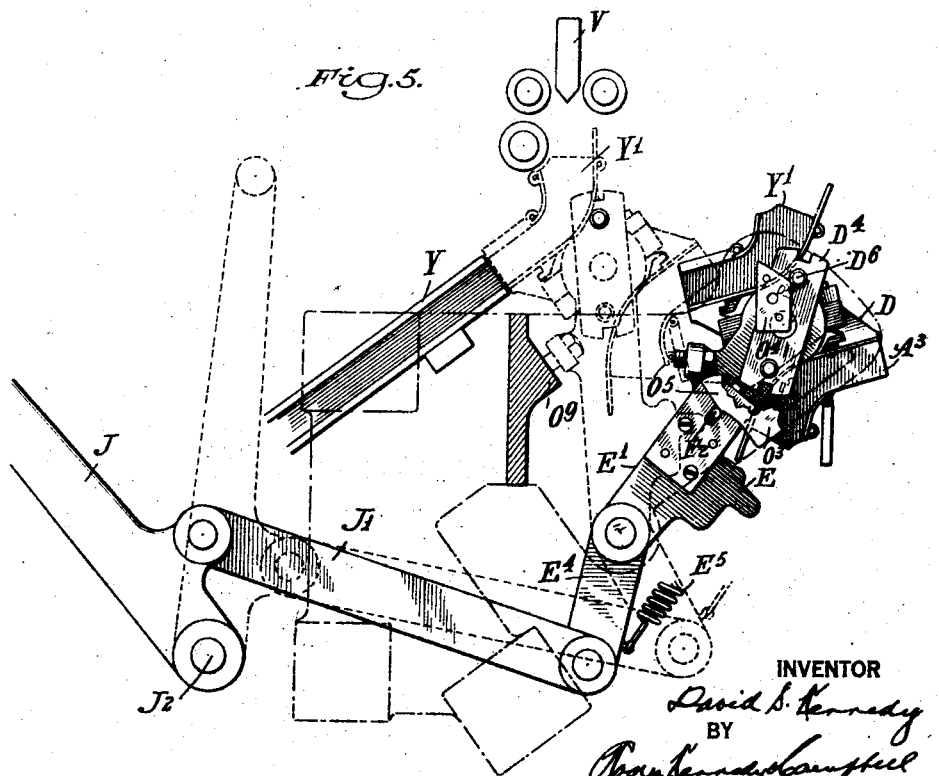
INVENTOR
David S. Kennedy
BY
ATTORNEYS

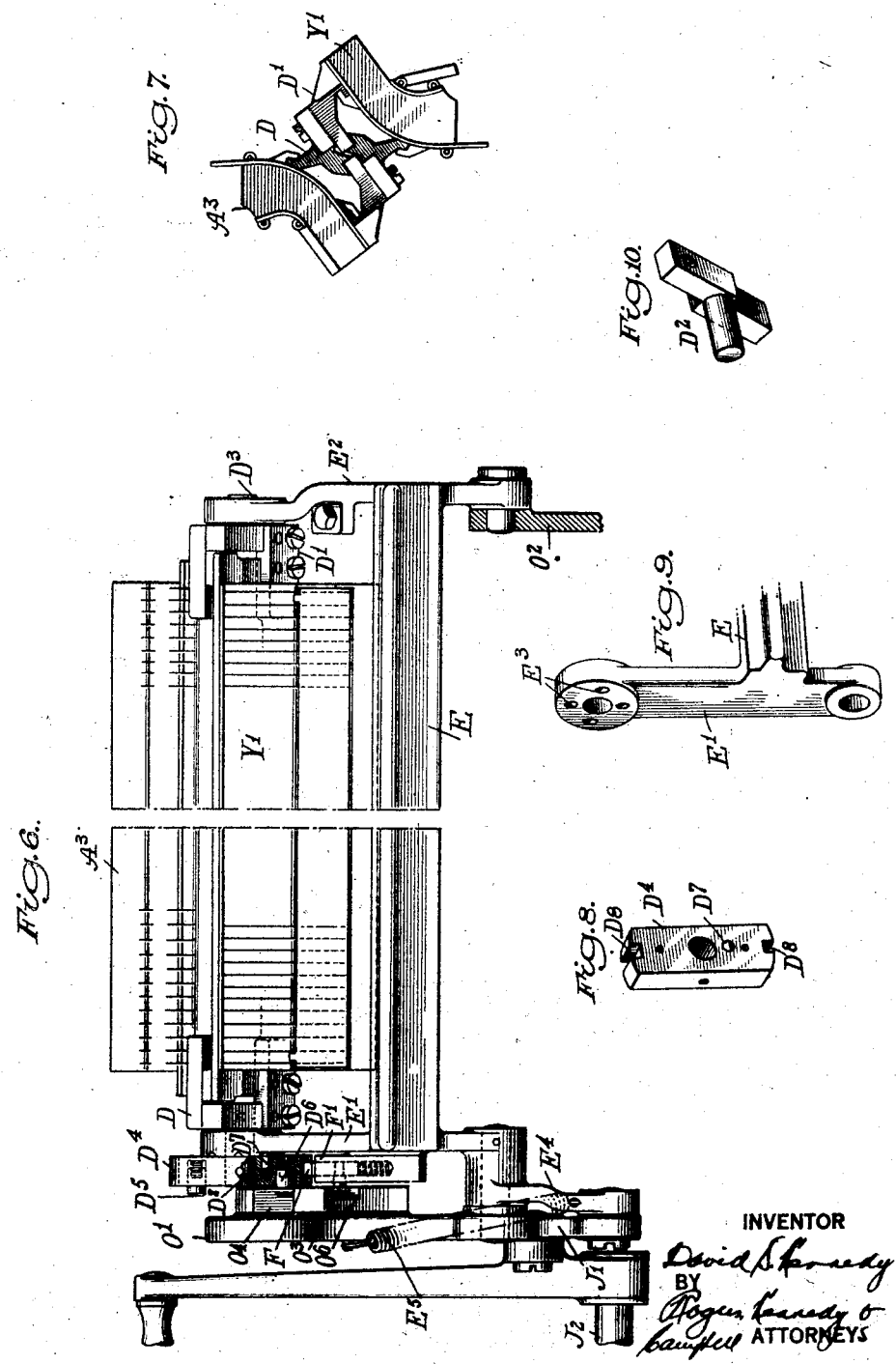

Jan. 19, 1926.  1,570,258
D. S. KENNEDY
TYPOGRAPHICAL COMPOSING AND DISTRIBUTING MACHINE
Filed June 20, 1924    7 Sheets-Sheet 5
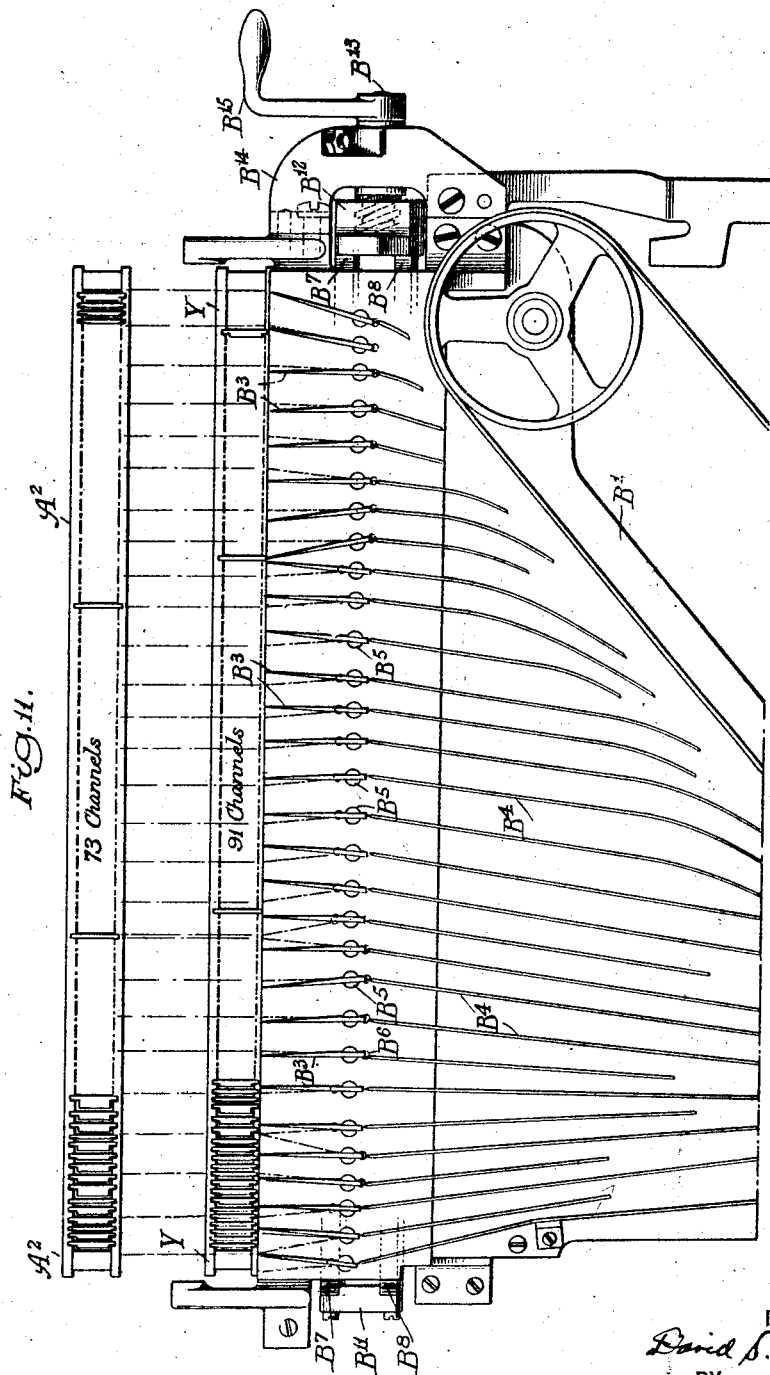
INVENTOR
David S. Kennedy
BY
Roger Kennedy Campbell
ATTORNEYS

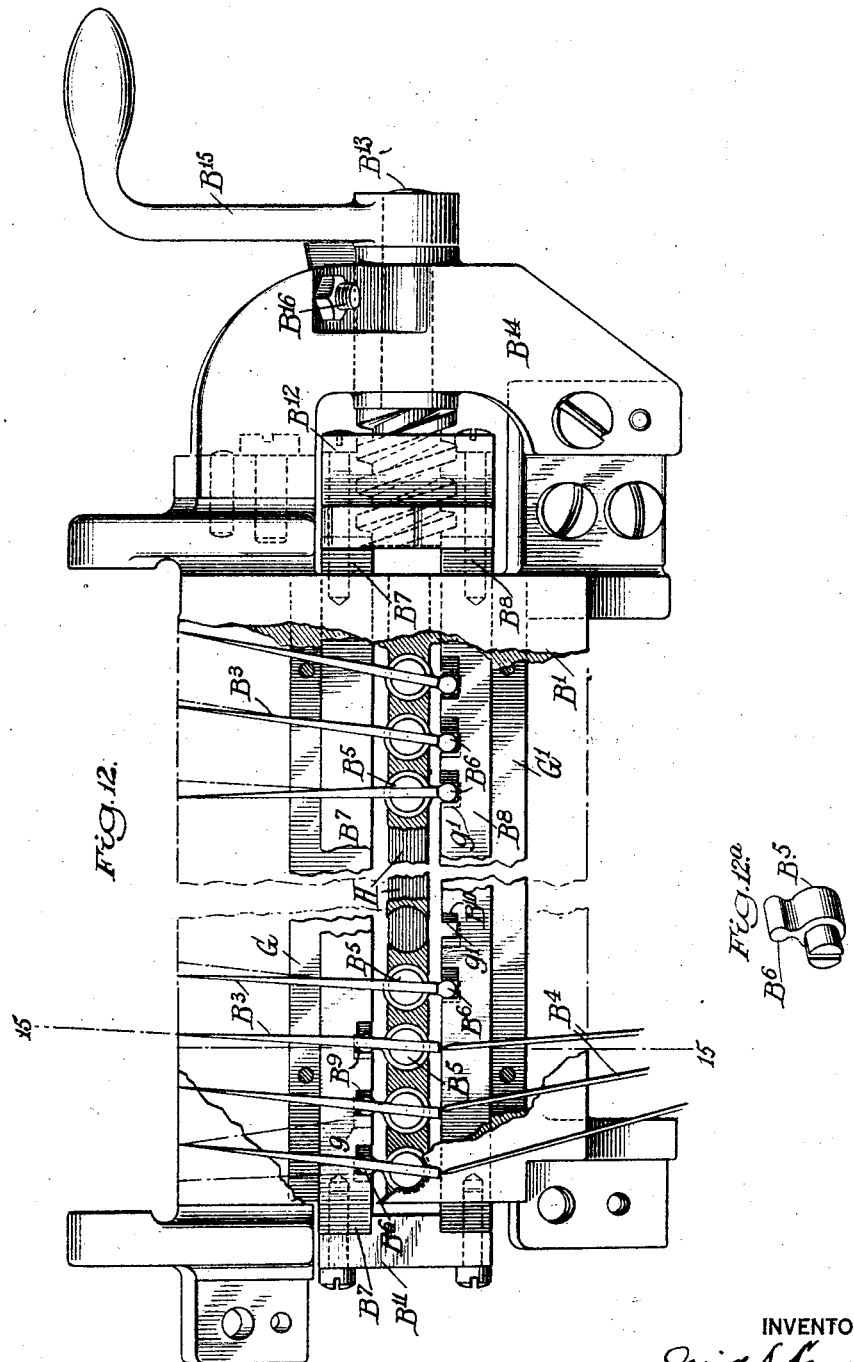

Jan. 19, 1926.  1,570,258
D. S. KENNEDY
TYPOGRAPHICAL COMPOSING AND DISTRIBUTING MACHINE
Filed June 20, 1924   7 Sheets-Sheet 7
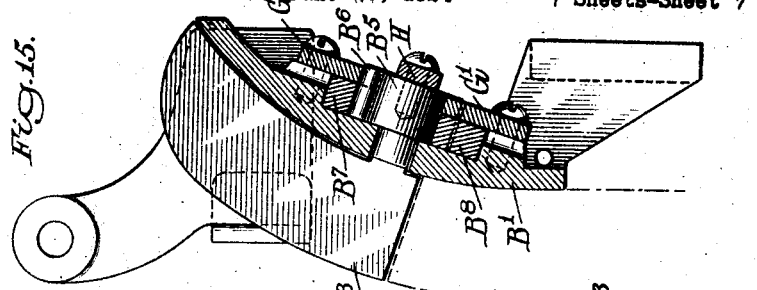
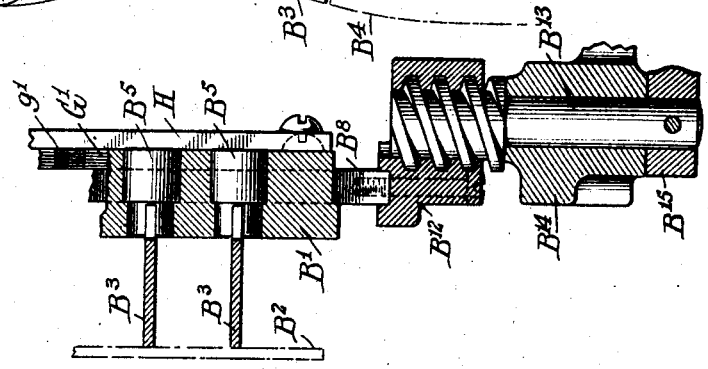
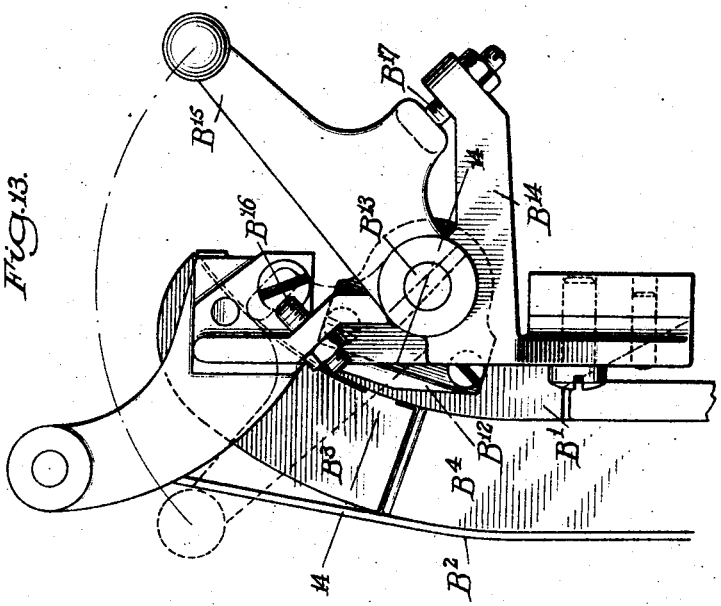
INVENTOR
David S. Kennedy
BY
Rogers, Kennedy Campbell
ATTORNEYS Patented Jan. 19, 1926.

1,570,258

UNITED STATES PATENT OFFICE.

DAVID S. KENNEDY, OF BROOKLYN, NEW YORK, ASSIGNOR TO MERGENTHALER LINOTYPE COMPANY, A CORPORATION OF NEW YORK.

TYPOGRAPHICAL COMPOSING AND DISTRIBUTING MACHINE.

Application filed June 20, 1924. Serial No. 721,182.

*To all whom it may concern:*

Be it known that I, DAVID S. KENNEDY, a citizen of the United States, residing at Brooklyn, in the county of Kings and State of New York, have invented certain new and useful Improvements in Typographical Composing and Distributing Machines, of which the following is a specification.

This invention relates to typographical composing and distributing machines, such as linotype machines of the general organization represented in Letters Patent of the United States to O. Mergenthaler, No. 436,532, wherein circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter returned through distributing mechanism to the magazine from which they started. More particularly, it relates to that class of machines (such as represented in my former Patent No. 1,397,974) designed to handle matrix fonts which differ from one another in the size and number of characters. These fonts, for example, may be the ordinary or ninety character fonts used exclusively for the composition of "straight" matter, and the special seventy-two or fifty-five character fonts used for the composition of head letter or display matter.

In machines of the above class, it has been found desirable to use two interchangeable magazine entrances. one to cooperate with the magazines containing the ordinary fonts and the other with magazines containing the display fonts. The present invention contemplates certain improvements which will enable these entrances to be interchanged with greater ease and facility and with far greater rapidity than has heretofore been possible. To this end, specifically, the entrances are arranged in inverted relation to each other upon a reversible holder or support which is rotatably mounted in a pivoted frame and is adapted to be rotated by the pivotal movement of said frame under the control of a hand lever located at the front of the machine.

The invention also contemplates certain other improvements which will enable the assembler entrance to cooperate properly with the matrix columns of either the ordinary fonts or the display fonts, as required. Accordingly, in the preferred embodiment illustrated, the upper portions of the matrix guide plates, which in effect become switch portions, are pivotally mounted so as to be capable of a limited sidewise adjustment in opposite directions, means being provided for quickly and accurately effecting the necessary adjustment of said switch portions.

In the accompanying drawings, the foregoing improvements have been shown in connection with a shiftable multiple magazine machine, such as that characterized by the commercial model 8 linotype, or as illustrated in the Rogers Patent No. 1,109,872, but it should be understood that they are equally applicable to machines of other kinds, including those equipped with a single magazine. In other words, the invention has been shown merely in preferred form and by way of example, and obviously many changes and modifications may be made therein without departing from its spirit. It is to be understood, therefore, that the invention is not limited to any specific form or embodiment except in so far as such limitations are specified in the claims.

Referring to the drawings:

Fig. 2 is an enlarged elevation of the magazine entrances and their associated mechanism;

Figs. 3, 4 and 5 are views similar to Fig. 2 but showing the parts in different relative positions during the interchange of the entrances;

Fig. 6 is a rear view of the parts shown in Fig. 2;

Fig. 7 is a detail end view of the magazine entrance unit detached, the trunnion blocks being removed therefrom;

Fig. 8 is a detail of the entrance rotating block;

Fig. 9 is a detail of a portion of the pivoted frame in which the entrances are rotatably mounted and showing detent recesses in the upper end thereof;

Fig. 10 is a detail of the entrance trunnion block;

Fig. 11 is a front elevation of the improved assembler entrance with the cover removed to show the interior matrix guide plates;

Fig. 12 is an enlarged elevation, partly broken away, of the upper part of the assembler entrance;

Figure 1:
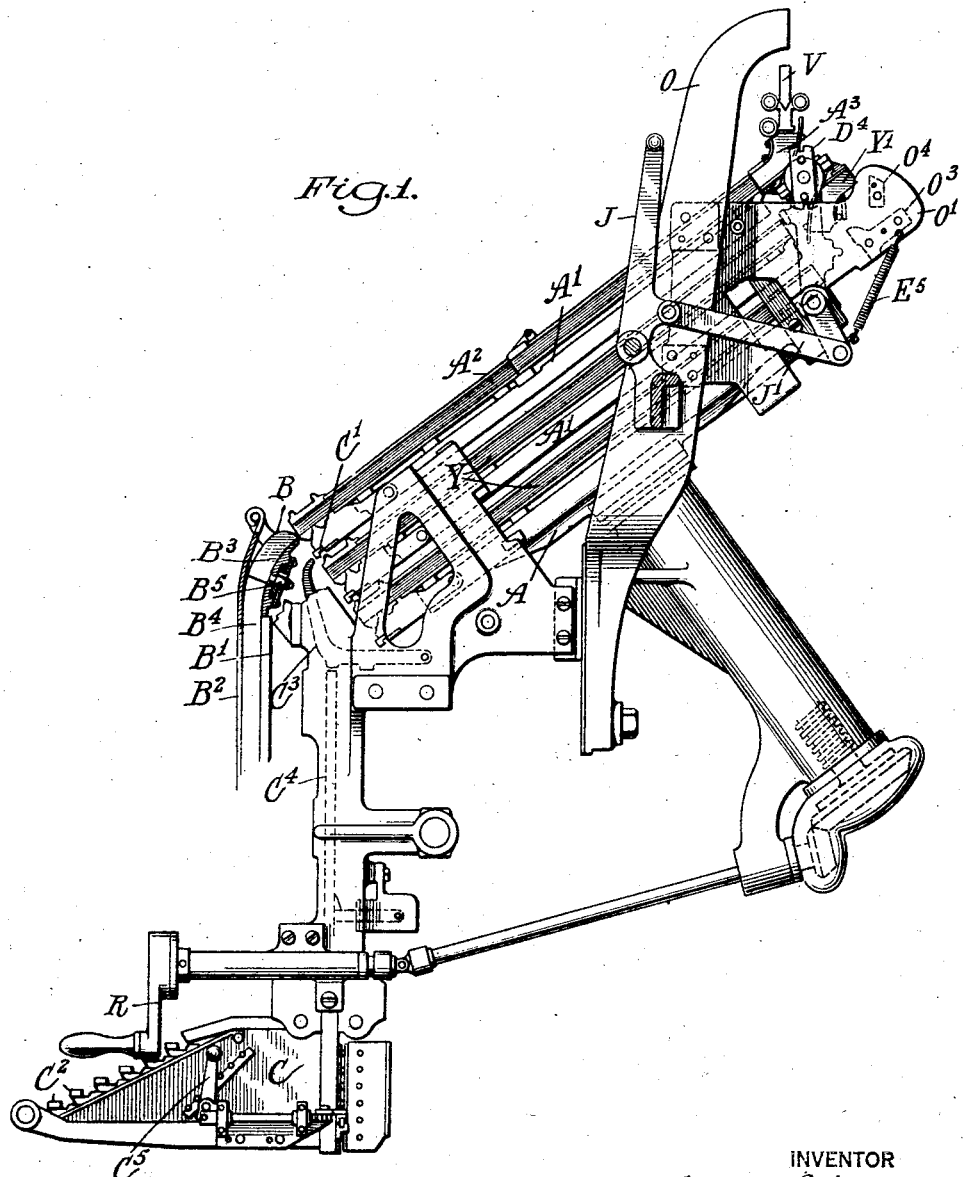
Fig. 1 is a side elevation of a linotype machine, equipped with the present improvements.

Fig. 12$^a$ is a detail of one of the pivot studs for the switch portions of the matrix guide plates;

Fig. 13 is an end elevation of the parts shown in Fig. 12;

Fig. 14 is a transverse section taken on the line 14—14 of Fig. 13; and

Fig. 15 is a vertical section taken on the line 15—15 of Fig. 12.

The several magazines are carried by a shift frame A, composed in part of two swinging base frames $A^1$, and which is arranged to be raised and lowered in the well-known manner by the operation of the hand crank R, so as to bring any selected one of the magazines into operative relation to the assembler entrance B. As herein illustrated, the shift frame A is provided with two magazines Y and with a single magazine $A^2$, the latter being mounted on the top base frame and divided into lower and upper sections as usual. The magazines Y are of the regular or standard form, being provided with ninety-one grooved channels spaced apart in the usual way to adapt them to contain the matrix columns of the ordinary ninety character fonts; whereas, the magazine $A^2$ is provided with only seventy-three grooved channels spaced apart in a different manner to adapt them to contain the matrix columns of the seventy-two character display fonts.

Each magazine (Fig. 1) is provided with its individual bank of matrix releasing escapements $C^1$, which are actuated from the keyboard C by the manipulation of the finger keys $C^2$ through the pivoted levers $C^3$ and the actuating reeds $C^4$. It is pointed out that while the matrix fonts of the magazines Y and $A^2$ are arranged therein substantially in the same order as to character, the corresponding matrices of the two fonts, that is to say, those bearing the same character, are stored in differently located channels due to the difference in number and spacing of such channels, so that the finger keys $C^2$ cannot act through the same series of connections in effecting the release of the matrices of the different fonts. Hence, mechanism is employed to provide different series of connections through which the finger keys may act. Such mechanism ordinarily comprises two series of keyboard slides and a series of U-shaped rocking bails, one series of slides being employed to make up direct connections between the finger keys $C^2$ and the escapements $C^1$ of a magazine Y in effecting the release of the matrices of the ordinary fonts, and the other series of slides, through the medium of the bails and other slides, being employed to make up indirect connections between the finger keys $C^2$ and the escapements $C^1$ of a magazine $A^2$ in effecting the release of the matrices of the display fonts. These slides are shiftable laterally by the manipulation of the small hand lever $C^5$ (Fig. 1), so as to bring one or the other of said series into operative relation with the finger keys, as desired. The foregoing parts and their mode of operation are described in detail in my former Patent No. 1,397,974, to which reference may be had, if desired.

Turning now to the present invention, attention is first directed to Figs. 1 to 10, which are devoted particularly to the illustration of the magazine entrances and the means employed for effecting their interchange. The two entrances $Y^1$, $A^3$, are adapted as usual to direct matrices from the distributor bar V (which in the present instance is of the regular ninety-one combination form) into the proper channels of their respective magazines. These entrances are similar to those shown in the patent just mentioned, the entrance $Y^1$ being provided with ninety-one matrix channels to cooperate with the magazines Y, and the entrance $A^3$ being provided with but seventy-three channels to cooperate with the magazine $A^2$. It will be noted (see Fig. 7) that these entrances are arranged back to back in inverted relation to each other, their supporting frames D, $D^1$ being fastened together as one and constituting (as shown) a reversible holder or support for the two entrances. This reversible holder is rotatably mounted, as by means of trunnions $D^2$, $D^3$ secured to its opposite ends, in the upright side members $E^1$, $E^2$ of a pivoted frame E mounted to rock in fixed brackets $O^1$, $O^2$, fastened to the inner faces of the main distributor bracket O. The frame E is normally held in operative position against a stop $O^9$ by a spring $E^5$ connected to the bracket $O^1$ and an arm $E^4$ depending from the frame E. With this arrangement, therefore, the pivoted frame E may be swung back and forth at will to move the entrance in use into and out of operative position and, at the same time, permit the reversal of the entrance holder, a half-rotation only being required to effect a change from one entrance to the other.

The trunnion $D^2$ (see Fig. 6) projects through its bearing in the upright member $E^1$ and has fastened thereto an entrance rotating block $D^4$, which is provided with a pair of protruding studs $D^5$, $D^6$ yieldingly mounted therein and located diametrically opposite each other. This block $D^4$ is further provided with a yielding detent $D^7$ adapted, by its successive engagements with recesses $E^3$ (Figs. 6 and 9) formed in the upper portion of the side member $E^1$, to temporarily retain the reversible entrance holder in different angular positions during its rotation. A spring latch F, slidably mounted within a plate $F^1$, secured to the side member $E^1$, is adapted to engage one or the other of a pair of notches $D^8$ formed in the opposite ends of the rotating block $D^4$. The latch F is provided with a releasing pin $F^2$, projecting laterally therefrom through an elongated slot in the plate $F^1$. According to the construction and arrangement just described, it is obvious that the pivoted frame E might be rocked backwardly, the latch F released, and the interchange of the entrances effected by rotating the reversible holder by hand. However, in carrying out the present invention, it is proposed to effect the rotation of the entrance holder automatically as the supporting frame E is rocked about its pivotal axis. To this end, there is provided a pair of cam plates $O^3$, $O^4$ fastened to the inner face of the fixed bracket $O^1$ and arranged to cooperate with the studs $D^5$, $D^6$ and the latch releasing pin $F^2$.

Referring to Figs. 2, 3, 4 and 5, which show the relative position of the parts at certain times during the interchange of the entrances, it will be noted that the lower cam plate $O^3$ is formed with a nose portion $O^5$ and an inner beveled portion $O^6$, the purpose of which will presently appear. The forward edge of the nose portion $O^5$ is so located that it will engage the latch releasing pin $F^2$ and cam it down as the pivoted frame E is swung back to the position indicated in Fig. 3. The latch F, as a consequence, is withdrawn from the notch in block $D^4$ and the reversible entrance holder thus freed for rotation. About the same time, the lower stud (which happens to be the stud $D^6$) contacts with the upper edge of the cam plate $O^3$ and, as the frame is moved to the limit of its backward stroke or as far as the stud $D^6$ permits, the entrance holder is turned around to the position indicated in Fig. 4, where it is temporarily sustained under the influence of the detent $D^7$. The stud $D^6$ is now in position to become engaged by the rear vertical face of the small upper cam plate $O^4$, upon the return movement of the pivoted frame E. By such engagement (the detent $D^7$ yielding) the entrance holder is turned further in the same direction (see Fig. 5), the stud $D^5$ being cammed inwardly by its engagement with the beveled portion $O^6$, so as to ride over the inner face of the lower cam plate $O^3$. This latter figure shows the parts in the condition they assume just before the entrance holder has completed its half-rotation, which takes place as the stud $D^6$ rides up the top inclined face of the cam plate $O^4$, the locking latch F, which is freed at about the same time, snapping into engagement with the rotating block $D^4$ and holding the parts in their reversed position. The dotted lines in Fig. 5 show the supporting frame E swung back to its normal position and the substitute entrance in use. It will be seen, therefore, that it is simply necessary to swing the frame E from and to its normal position in order to interchange the two entrances. In order that this may be effected from the front of the machine, there is provided a conveniently located hand lever J, journalled on a fixed pivot $J^2$ and connected by a link $J^1$ to the depending arm $E^4$ of the frame E. Consequently, by operating the hand lever forwardly and backwardly, the frame E will be rocked on its pivotal axis to carry out the operation of the parts just described.

Attention is next directed to Figs. 11 to 15, which illustrate the improvements made in the assembler entrance B, which comprises, as usual, a back plate $B^1$ having a curved top or bridge portion, a cover plate $B^2$, and a series of intervening upright matrix guide plates. These matrix guide plates, which ordinarily consist of thin strips of metal fastened edgewise in predetermined spaced relation to the back plate $B^1$, are, according to this invention, made adjustable and, in the preferred embodiment illustrated, are divided into upper and lower sections $B^3$, $B^4$, respectively. The lower sections $B^4$ are secured in the usual way to the entrance back plate, while the upper sections $B^3$, which constitute in effect switch portions, are fastened by tongues into the slotted ends of pivot studs $B^5$, journalled in the bridge portion of the back plate and held in place by a retaining bar H secured to said bridge portion. These switch portions, due to their pivotal mounting, are thus rendered capable of a limited sidewise adjustment in opposite directions to adapt them to cooperate with the matrix columns of all fonts. In Fig. 11, the switch portions are shown, by the full lines, in position for cooperation with the matrix columns of an ordinary or ninety character font, and, by the broken lines, in position for cooperation with the matrix columns of a seventy-two character or display font. It will be noted that the upper ends of the switch portions in both positions bear a definite relation to the magazine channels, this being due to the fact that the matrices of the particular fonts shown have their projecting ears located substantially flush throughout the set with the same side of the matrix. With other fonts, however, such for example as the fifty-five character display font described in my prior Patent No. 1,397,967, wherein the setwise positions of the projecting ears vary with relation to the side faces of the matrices, the switch portions might be adjusted to cooperate with the matrix columns without regard to the magazine channels. The means employed for adjusting these switch portions will now be described in detail.

As shown in several of the figures, the pivot studs B⁵ are provided with lips B⁶, certain of which project upwardly to engage notches B⁹ formed in a shift bar B⁷, while others project downwardly to engage notches B¹⁰ formed in a similar shift bar B⁸. These shift bars are slidably mounted in a guideway formed in the rear face of the back plate B¹ and are held in place by keeper plates G, G¹ fixed to said plate. At one end, the shift bars are connected together by a block B¹¹, while at the other end they are fastened to a nut B¹², which receives the threaded end of a stub shaft B¹³ journalled in a fixed bracket B¹⁴. The shaft B¹³ is provided with a small hand crank B¹⁵ adapted to be moved back and forth between a pair of adjustable stop pins B¹⁶, B¹⁷, which serve to limit the movement of the hand crank in opposite directions. With this arrangement, it will be seen that by moving the hand crank B¹⁵ in one direction or the other, the shift bars will be pushed or drawn horizontally a limited distance and, through their engagement with the lips B⁶, swing the switch portions sidewise to either position of adjustment.

It is pointed out, however, that in providing for their proper adjustment, the switch portions B³ are moved different distances, the notches in both the upper and lower shift bars B⁷, B⁸ being made of varying widths for this purpose (see particularly Fig. 12). Consequently, when the bars are shifted a given distance in either direction, the stud lips B⁶ will be engaged by the walls of said notches at different times and the extent of movement transmitted to the switch portions thereby varied. Thus, as the hand crank B¹⁵ is pulled forwardly, the right side walls of the notches B⁹, B¹⁰ engage the projecting lips B⁶ in a certain predetermined order of succession, such that when the stroke of the hand lever is completed, the switch portions will have been rocked to their proper individual positions for one condition of adjustment, those engaged with the upper bar B⁷ being moved in one direction and those engaged with the lower bar B⁸ being moved in the opposite direction. Conversely, when the hand lever is pushed rearwardly, the left hand walls of the notches function in like manner to move the switches in reverse directions to their proper individual positions for the other condition of adjustment. In order to assist in locating the switch portions in their different adjusted positions and to lock them securely in such positions, the keeper plates G, G¹ are provided with notches $g$, $g'$ wherein the projecting lips B⁶ of the pivot studs also engage. These notches $g$, $g'$ correspond with the notches B⁹, B¹⁰ in the shift bars and bear such relation thereto that the stud lips will be crowded between the opposite walls of the keeper plate notches and the shift bar notches (see Fig. 12) when the hand crank is located in either of its extreme positions against the stops B¹⁵, B¹⁶. It may be noted that the location of the pivot studs B⁵ is such that the switch portions B³ of the matrix guide plates are maintained in proper registration with the fixed portions B⁴ in all positions of adjustment.

As before stated, the present improvements have been shown merely in preferred form and by way of example and as applied to a particular kind of machine, but obviously many modifications and alterations therein and in their mode of adaptation will readily suggest themselves to those skilled in the art and still be comprised within the scope of the invention.

Having thus described my invention, its construction and mode of operation, what I claim and desire to secure by Letters Patent of the United States, is as follows:

1. In a typographical composing and distributing machine adapted to be equipped with interchangeable magazines, one containing a set of matrices occupying certain channels according to character and the other containing a set of matrices occupying differently located channels according to character, the combination of two magazine entrances having their respective channels arranged to correspond with the magazine channels, means operable to bring either entrance into operative position for cooperation with the magazine in use, an assembler entrance provided with a series of adjustable matrix guide plates, and means for adjusting said plates sidewise at their upper ends to adapt the entrance to cooperate with the matrices of the magazine in use.

2. In a typographical composing and distributing machine adapted to be equipped with interchangeable magazines, one containing a set of matrices occupying certain channels according to character and the other containing a set of matrices occupying differently located channels according to character, the combination of two magazine entrances interchangeable in position with each other so as to cooperate with the magazine in use and having their respective channels arranged to correspond with the magazine channels, an assembler entrance provided with a series of matrix guide plates, and means for adjusting the guide plates sidewise at their upper ends so as to locate them in position to cooperate with the matrices of the magazine in use.

3. In a typographical distributing machine, the combination of two or more magazine entrances movably mounted so as to be interchangeable in position with each other, and means operable at will for effecting such interchange.

4. In a typographical distributing machine, the combination of two or more magazine entrances, a pivoted frame in which they are rotatably mounted so as to be interchangeable in position with each other, a hand lever connected to said frame for rocking it about its pivotal axis, and means arranged to rotate the entrances during the rocking of the pivoted frame in effecting their interchange.

5. In a typographical distributing machine, the combination of two or more magazine entrances interchangeable in position with each other, a pivoted frame in which they are movably mounted, and means for automatically effecting their interchange as the pivoted frame is rocked about its axis.

6. In a typographical distributing machine, the combination of two or more magazine entrances interchangeable in position with each other, and a pivoted frame in which the entrances are rotatably mounted for interchange.

7. In a typographical distributing machine, the combination of two or more magazine entrances interchangeable in position with each other, a rotatable holder or support therefor, and a pivoted frame in which said rotatable holder is mounted.

8. In a typographical distributing machine, the combination of two magazine entrances arranged in inverted relation to each other and reversible at will for interchange.

9. In a typographical distributing machine, the combination of two magazine entrances arranged in inverted relation to each other, and a reversible holder or support for said entrances, whereby they may be interchanged in position with each other.

10. In a typographical distributing machine, the combination of two magazine entrances arranged in inverted relation to each other, a reversible holder or support therefor, and a pivoted frame carrying said holder.

11. In a typographical distributing machine, the combination of two magazine entrances arranged in inverted relation to each other, and means operable to reverse said entrances for bringing either into use as required.

12. In a typographical distributing machine, the combination of two magazine entrances arranged in inverted relation to each other, a rotatable holder or support therefor, and means operable to reverse the position of said rotatable holder for bringing either magazine entrance into use as required.

13. In a typographical distributing machine, the combination of two magazine entrances arranged in inverted relation to each other, a reversible holder or support therefor, a pivoted frame in which said holder is rotatably mounted, and means controlled by the pivotal movement of said frame to reverse the position of the rotatable holder for bringing either magazine entrance into use as required.

14. In a typographical distributing machine, the combination of two magazine entrances arranged in inverted relation to each other, a reversible holder or support therefor, a pivoted frame in which said holder is rotatably mounted, a hand lever operable from the front of the machine and connected to the pivoted frame for rocking it about its pivotal axis, and means controlled by the rocking movement of said pivoted frame to reverse the position of the rotatable holder for bringing either magazine entrance into use as required.

15. In a typographical distributing machine, the combination of two magazine entrances arranged in inverted relation to each other, a pivoted frame in which they are rotatably mounted for interchange, and releasable means for locking the entrances in either of their reversed positions.

16. In a typographical distributing machine, the combination of two magazine entrances arranged in inverted relation to each other, a reversible holder or support therefor, a pivoted frame in which said holder is rotatably mounted, a latch for locking the holder in either of its reversed positions, a rotatable block attached to the holder and provided with pins yieldingly mounted therein, and a pair of fixed cam plates arranged to cooperate with said locking latch and block pins as the supporting frame is rocked about its pivotal axis and reverse the position of the rotatable holder for bringing either magazine entrance into use as required.

17. In a typographical composing machine adapted to be equipped with interchangeable magazines, one containing a set of matrices occupying certain channels according to character and another containing a set of matrices occupying differently located channels according to character, the combination of an assembler entrance provided with a series of adjustable matrix guide plates, and means for adjusting said plates sidewise so as to locate their upper ends in position to cooperate with the matrices of the magazine in use.

18. In a typographical composing machine adapted to be equipped with interchangeable magazines, one containing a set of matrices occupying certain channels according to character and another containing a set of matrices occupying differently located channels according to character, the combination of an assembler entrance provided with a series of upright matrix guide plates comprising upper and lower portions, and means for adjusting the upper portions of the guide plates sidewise so as to locate them in position to cooperate properly with the matrices of the magazine in use.

19. In a typographical composing machine adapted to be equipped with interchangeable magazines, one containing a set of matrices occupying certain channels according to character and another containing a set of matrices occupying differently located channels according to character, the combination of an assembler entrance provided with a series of upright matrix guide plates presenting upper switch portions, and means for adjusting said switch portions sidewise in opposite directions to locate them in position to cooperate with the matrices of the magazine in use.

20. In a typographical composing machine, the combination of an assembler entrance adapted to receive matrices as they are discharged from their magazine and provided with a series of upright matrix guide plates presenting upper switch portions, and means for moving the switch portions sidewise to different predetermined positions of adjustment.

21. In a typographical composing machine, the combination of an assembler entrance adapted to receive matrices as they are discharged from their magazine and provided with a series of upright matrix guide plates presenting upper switch portions, and means adapted at each operation to adjust certain of said switch portions sidewise in one direction and others sidewise in the opposite direction, for the purpose described.

22. In a typographical composing machine, the combination of an assembler entrance adapted to receive matrices as they are discharged from their magazine and provided with a series of upright matrix guide plates presenting upper switch portions, means for adjusting certain of said switch portions sidewise in one direction and others sidewise in the opposite direction, and means for locking them in their adjusted positions.

23. In a typographical composing machine, the combination with an assembler entrance adapted to receive matrices as they are discharged from their magazine and comprising a back plate, a cover plate and a series of intervening matrix guide plates, the latter presenting upper switch portions pivoted to the back plate, of a pair of shift bars operatively engaged with the switch portions and adapted to move them into varying positions of adjustment, and means for actuating the shift bars.

24. In a typographical composing machine, the combination of an assembler entrance comprising a back plate, a cover plate and a series of intervening matrix guide plates, the latter presenting upper switch portions pivoted to the back plate, a pair of shift bars operatively engaged with said switch portions at opposite sides of their pivots so as to adjust them sidewise in both directions, and means for actuating the shift bars in unison in either direction.

25. In a typographical composing machine, the combination with an assembler entrance adapted to receive matrices as they are discharged from their magazine and comprising a back plate, a cover plate and a series of intervening matrix guide plates, the latter presenting upper switch portions attached to pivot studs journalled in the back plate, of shift bars provided with notches wherein engage lips formed on the pivot studs, fixed keeper plates arranged alongside the shift bars and having corresponding notches wherein the said lips also engage, and means for moving the shift bars in opposite directions to effect the adjustment of the switch portions in the required manner.

26. In a typographical composing machine, the combination of an assembler entrance adapted to receive matrices as they are discharged from their magazine and provided with a series of upright matrix guide plates comprising lower fixed portions and upper movable portions, and means for adjusting the upper portions of said guide plates sidewise relatively to the lower portions without disturbing their registration with each other.

27. In a typographical composing machine, the combination of an assembler entrance provided with a series of upright matrix guide plates comprising lower fixed portions and upper pivoted switch portions, the latter being mounted to swing sidewise without disturbing their registration with the lower fixed portions, and means for setting the switch portions in varying positions of adjustment for cooperation with the different magazines.

In testimony whereof, I have affixed my signature hereto.

DAVID S. KENNEDY.